R. M. PACKARD

April 7, 1931. PATTERN GRADING MACHINE Re. 18,032

Original Filed Jan. 24, 1920 3 Sheets-Sheet 1

INVENTOR
R M Packard

R. M. PACKARD

April 7, 1931. PATTERN GRADING MACHINE Re. 18,032

Original Filed Jan. 24, 1920 3 Sheets-Sheet 2

INVENTOR.
R M Packard

R. M. PACKARD

April 7, 1931. PATTERN GRADING MACHINE Re. 18,032

Original Filed Jan. 24, 1920 3 Sheets-Sheet 3

INVENTOR.
RM Packard

Reissued Apr. 7, 1931

Re. 18,032

UNITED STATES PATENT OFFICE

ROSCOE M. PACKARD, OF NEWTON, MASSACHUSETTS, ASSIGNOR TO UNITED SHOE MACHINERY CORPORATION, OF PATERSON, NEW JERSEY, A CORPORATION OF NEW JERSEY

PATTERN-GRADING MACHINE

Original No. 1,520,075, dated December 23, 1924, Serial No. 353,738, filed January 24, 1920. Application for reissue filed June 24, 1929. Serial No. 373,419.

This invention relates to pattern reproduction, that is, to copying or reproducing from objects generically termed "patterns" or master patterns, usually termed "models," objects having a systematic resemblance to such patterns, examples of such objects being shoe lasts and patterns, apparel patterns, gun-stocks, hat blocks, artificial limbs, and the like. The invention is disclosed by way of illustration, but not by way of limitation, as embodied in a machine especially designed for grading from a model or master pattern flat objects, such as patterns for footwear, gloves or other apparel.

Machines of the pattern reproducing type comprise four primary instrumentalities, viz., model holder, work holder, model wheel or follower and tool, and are so arranged that the relation of the tool to the work is determined by the relation of the model wheel to the model to effect the reproduction. They usually contain, also, grading mechanism, which is in effect generally a pantographic device for magnifying or reducing the model in the reproduction. In the ordinary "pattern grading" machine (the term "pattern" being here used to denote the product, as distinguished from the designation of the general art to which the machine belongs) there are two such devices which operate independently to magnify the length and width of the model, this machine being a two-dimensional one. In the last lathe there are also two such devices, one of which operates on the longitudinal dimension and the other of which acts upon the two lateral dimensions of the pattern. The action of a grading mechanism is, in effect, to divide the model into differential elements or sections and to reproduce these elements in accordance with some (generally pantographic) law and integrate the results in the work. In pattern grading these differential elements are narrow strips, or lines drawn parallel to the length and width respectively of the model. In the making of lasts they are the series of parallel transverse plane sections as regards the width grader and the aggregate of straight lines drawn in the model parallel to its length, as regards the length grader. These differential elements are maintained in unchanged relative order as regards the reproduction so that the aggregate of the reproductions bears a definite relation (generally pantographic) in whole and in part, to the aggregate of the differential elements, i. e., the model.

It has been found that the reproduction secured through the action of such grading mechanism is not always such as to give satisfactory results, a reproduction which is anomalous otherwise than by being merely non-pantographic as regards reproduction of differential elements considered individually, being sometimes desirable. For example, it may be desired to grade a set of flat patterns from a model or master pattern but differing from it systematically in shape, though having substantially the same area as patterns pantographically or otherwise developed from the model. As an illustration, consider two sets of sole patterns for two sets of shoe lasts differing only in the amount of "swing" (which is the horizontal angle between the axis of the forepart and the axis of the heel part). A pattern from either set of sole patterns could be generated by cutting the corresponding pattern of the other set into thin transverse strips and differentially shifting these strips on one another parallel to their length. The term "shift" as used in this specification refers to a relative movement of differential elements parallel to themselves, that is, a relative sliding on one another, as distinguished from a relative movement of approach and separation perpendicular to themselves.

It is a principal object of my invention to provide for reproducing differential elements of a model in arbitrarily relatively shifted positions in the work and to effect this result, preferably independently, in a plurality of dimensions. In another aspect the invention provides for the systematic reproduction of differential elements of a model in similar relations to a plurality of axes, or to a plurality of space dimensions, and for the relative shifting of such reproduced elements in relation to a selected one or more of such axes, or such dimensions; or, in still another view, the reproduction of such differential elements in such shifted positions in the work.

In still another aspect the invention provides for the relative displacement, in a selected one or more of several dimensions, of differential elements of a model, and their reproduction in the work. In the machine herein set forth, I accomplish this result by causing a movement of one of the primary instrumentalities of the pattern reproducing machine, or a relative movement between one of them, and one or more of the other three such instrumentalities, independent of the normal movement incidental to the action of the machine considered as a differential element reproducer. Such a relative movement is produced in a plurality of dimensions or in an arbitrarily selected one of a plurality of dimensions. In the machine shown the model is shiftable independently and simultaneously in the dimensions of length and width by a cam controlled mechanism. A cam related to each dimension determines the shift of the model along the other dimension at the instant a differential element parallel to the latter dimension is being reproduced.

In another aspect of the matter, I vary in a plurality of dimensions the normally similar relations between corresponding pairs of the primary instrumentalities of the machine or between these instrumentalities and the grading axes (these normally similar relations being those incidental to the normal type (generally pantographic) of reproduction effected by the machine) in order to effect small relative shiftings of reproduced differential elements of the model. It is not, however, necessary that the normal action of the machine be pantographic. My invention provides for the production of reproduced differential elements in relatively shifted position, whatever the nature of the differential element reproduction characteristic of the machine.

In still another aspect of the invention I contemplate moving or displacing one of the primary instrumentalities of the reproducing machine transversely to a grading axis in addition to the normal behavior of that instrumentality as regards said axis which is characteristic of the machine independently of any shifting of differential elements, and doing this, preferably independently, in more than one dimension. In the machine shown, the model is normally at rest in the ordinary reproducing action of which the machine is capable, and the present invention supplies mechanism for moving it transversely of two grading axes at right angles to each other to effect a relative shift of reproduced differential elements considered with respect to the two axes independently. In particular I propose that this additional movement or displacement shall have any predetermined magnitude, including zero, at any part of the work. In the illustrated machine this result is accomplished by cams, working independently in each dimension of the model and work, the zero movement or displacement being produced by a straight portion of the corresponding cam.

These and other aspects and features of the invention will be better understood from the following description of a preferred embodiment of the invention selected for purposes of illustration and shown in the drawings, in which Fig. 1 is a plan view of the machine;

Figs. 2 and 3 are vertical sections on lines 2—2 and 3—3, respectively;

Figure 1:
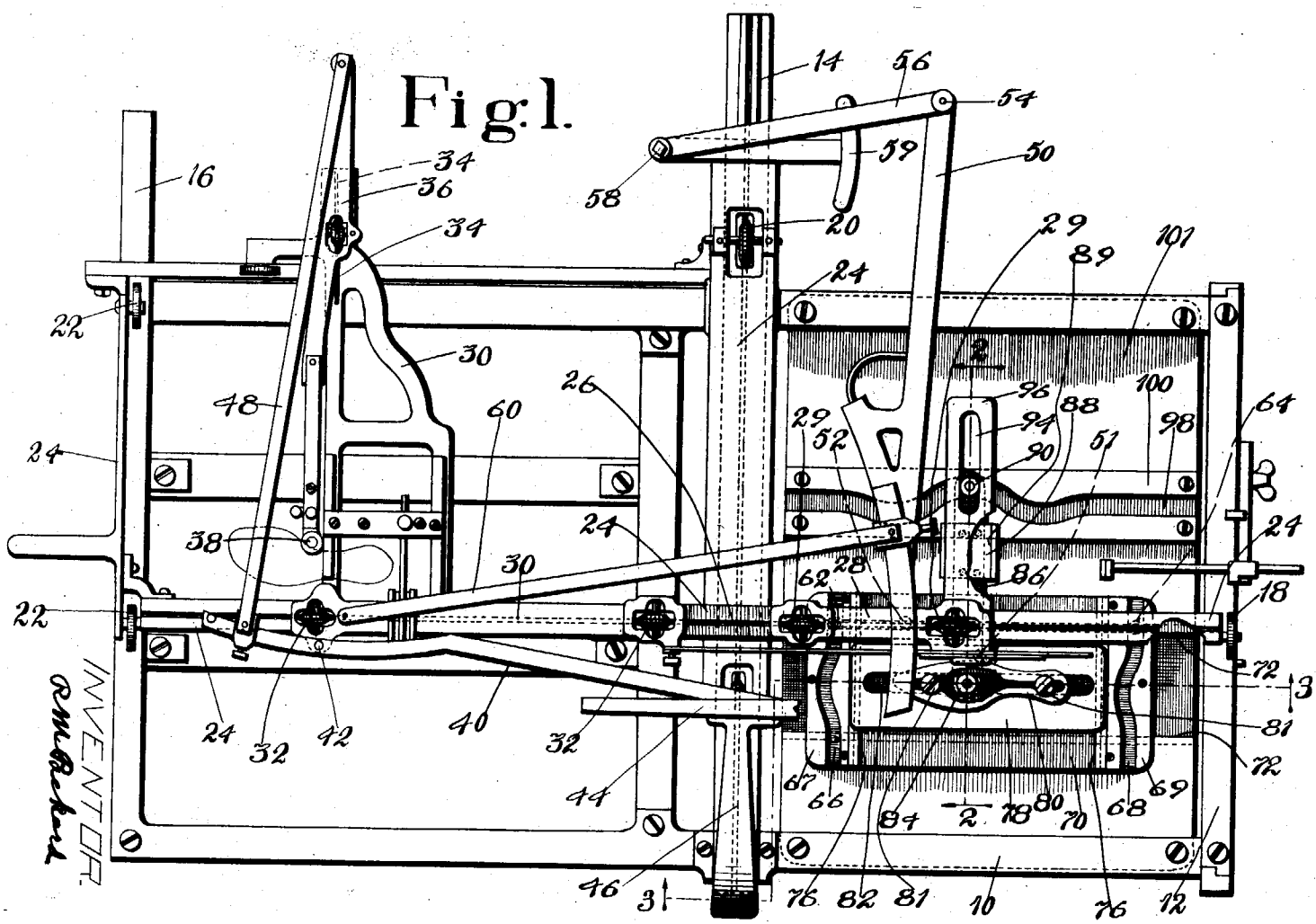

The main frame 10 of the machine with its transverse tracks 12, 14 and 16 for the rollers 18, 20, 22 of the carriage 24 and the track 26 on this carriage for the carriages 28 (moving on rollers 29) and 30 (moving on rollers 32) are all of ordinary construction. The carriage 30 and its track 34 for the upper carriage 36 carrying the work treating tool 38; the width grading lever 40 pivoted at 42 on the carriage 30 and having sliding engagement in the slide 44 (shown broken away in Fig. 1) mounted on the overhanging arm 46, the adjustable link 48 connecting the carriage 36 to the width grading lever, are, in the machine shown, all of ordinary Hartford pattern grader construction and operation and need not be further described. The length grading apparatus comprising the length grading lever 50, pivoted at 52 to the carriage 28 which carries the model guide, model wheel or leader 51, and at 54 to the end of the link 56 which is itself pivoted at 58 on an arm extending from the frame 10 and rests upon the support 59, and the adjustable link 60 connecting the length grading lever and the carriage 30 are all of ordinary construction.

The carriage 24 has projecting from its lower side two cam rolls or followers 62 and 64 which engage identical cam tracks 66 and 68 in cam blocks 67, 69, both removably mounted in the block 70 which is itself mounted in a slideway 72 extending longitudinally of the machine. Movement of the carriage 24 transversely of the machine along the tracks 12, 14 and 16 will, through the reaction between the cam rollers and the cam tracks, cause the block 70 to move longitudinally along the slideway 72.

The block 70 has a guide 76 in which works a block 78 upon which is fastened securely the model 80 by bolts 81 as is well understood. This block has a straight slot 82 lying longitudinally of the machine, in which works a roller 84 mounted upon one end of a bar 86 which rests slidably on the block 70 and has bolted to it a pedestal 88, having a guide 89 in its upper surface. The bar 86 carries upon its other end cam rollers 90 and 92, one above and one below the bar. The upper roller works in a slot 94 in an arm 96 sliding in the guide 89 and fixedly attached to the carriage 28, which aside from this arm is of ordinary construction. The lower roller 92 works in a cam slot 98 in a block 100 which is removably bolted to a plate 101, attached to the frame of the machine. Movement of the carriage 28 upon its track 26 will carry the roller 90 longitudinally of the machine and will through the reaction transmitted through the roller 90 and the pedestal 88 to the bar 86 and through the lower roller 92 to the cam track 98 cause the bar 86 to move transversely of the machine and through the roller 84 to move the block 78 also in the transverse direction upon the guide 76 in the block 70.

The pedestal 88 and guide 89 may be replaced by any convenient mechanism which will permit the bar 86 perfect freedom of horizontal movement without loss of orientation. The guide 89 preserves the orientation.

The operation of the machine will now be described. Suppose first that the carriage 24 is moved on its tracks, without any movement of the carriage 28 on its track 26. The arm 96 will slide in the guide 89 and will move over the roll 90, without disturbing it. The rolls 62 and 64 will move in the cam slots 66, 68 and cause the blocks 70 and 78 to move longitudinally of the machine, carrying the pattern with them, the slot 82 moving over the roll 84. The pattern will have no lateral movement.

Suppose, second, that the carriage 24 remains motionless, but that the carriage 28 moves on the track 26. The plate 70 remains motionless. The arm 96 moves with the carriage 28, and drags the guide 89 and pedestal 88 and bar 86 with it. The cam roll 90 causes the bar 86 to move laterally of the machine and the roll 84 moves the block 78 and the pattern laterally. The pattern will have no longitudinal movement.

It will thus be seen that the longitudinal position of the block 78 carrying the pattern is governed solely by the lateral position at any instant of the carriage 24 (and carriage 28), and that the lateral position of the block 78 and the pattern is governed solely by the longitudinal position of the carriage 28. The two movements of the pattern in the two dimensions are entirely independent of each other.

The blocks carrying the cam tracks are removable so that the cams may be of any shape desired in connection with any particular piece of work. Assume the cams 66, 68 to be straight and parallel to the track 12, and analyze the question of reproduction of a straight line drawn transversely to the length of the pattern, that is, parallel to the track 12. Such a line may be called a "differential element" and the pattern may be regarded as composed of an infinite number of such parallel straight lines lying side-by-side. When the model wheel 51 is at either extremity of this line, the cam roller 90 will be in the same position in the cam slot 98 so that the model will be in the same position relatively to the guide 76 whichever end of the line the model wheel 51 happens to be engaging, and will be displaced laterally from its normal position by the same amounts when the model wheel is at both ends of the line, depending on the shape of the cam slot 98, the model wheel being in the same longitudinal position on the model in both cases. This displacement of the model will of course affect the lateral position of the model wheel 51 at the instant of contact and will be communicated through the carriages to the tool 38 so that the line in question will be reproduced in the work displaced along its own length from the position it would assume if reproduced in the ordinary pattern grading machine, but unchanged in length since the magnification introduced by the width grading mechanism, which is dependent only upon the distance between the ends of the original line, is not affected by the shift of the model. By a proper design of the cam track 98, therefore, the successive parallel transverse lines or "differential elements" or "sections" into which the model can be regarded as cut up can be relatively shifted upon each other in any desired way, while being magnified or diminished in any desired grading ratio.

In other words, the model wheel, tool, and the ordinary grading mechanism present in the machine "reproduce" this differential element in the sense that its length is magnified by the width grading mechanism and its longitudinal position in the work is determined by the length grading mechanism. Its lateral position, however, is shifted sidewise in the work irrespective of the magnification, by the cam mechanism disclosed as embodying a characteristic of the present invention. In short, the machine of the present invention reproduces the differential element exactly as the old machine reproduced it, and in addition shifts it parallel to its length.

Figure 4:
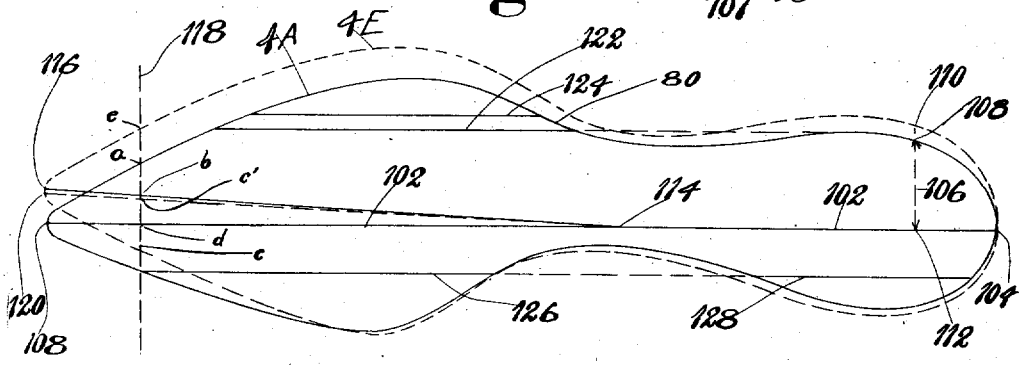
Fig. 4 is a diagrammatic view showing the performance of the machine.

An illustration is given in Fig. 4. In the ordinary practice of grading, the pattern is placed upon the machine with a conveniently adopted axis in coincidence with the longitudinal axis of the machine. The pattern is illustrated as a sole pattern and the axis of the sole pattern is the line joining the centers of the toe and heel ends, shown in Fig.

4 as the line 102 joining the points 104 and 108. The width grader acts in such manner as to multiply all distances 106 perpendicular to this axis, which is here the grading axis, by the grading ratio and to measure the results from a corresponding axis in the work, taken here as coincident with the line 102, the work being shown as superposed on the model for the sake of clearness. At the point 112 the effect will be, as shown in Fig. 4, to reproduce the point 108 at the point 110, the distance 110—112 being equal to the distance 108—112 multiplied by the grading ratio which we may call *r*. Suppose that it is desired to grade the model sole pattern 80, shown in Fig. 4 as a 4A, up to the 4B width and at the same time to alter the "swing" so that the resulting sole pattern obtained will have the shape shown in dotted lines in Fig. 4, where the forepart has been swung about the point 114 into the position 114—116. In order to reproduce the point *a* at the point *e*, the model will be shifted upwardly in Fig. 4 by the cam mechanism of the machine until a certain point *c* in the model falls upon a point *d* (of the original position) of the grading axis 102. The distance *ca* then will be multiplied by the grading ratio and the result plotted from the corresponding axis in the work which, in my overlapping of the model and work, will be the line 102 again, still in its original position on the paper. The width grader insures that *de* in the work is equal to *r* multiplied by *ca* in the model. *de* being known from the requirements of the problem, the point *c* is thus determined. The shape of the cam 98 necessary to produce this movement may be found by plotting a point *c'*, above the point *d* so that *dc'* equals *dc* and the locus of the points *c'*, namely the line 114—120, will determine the part of the cam corresponding to the forepart. The entire cam will have the shape and size given by the line 104—114—120, that is, it will be composed of two straight lines, 104—114, parallel to the track 26, and 114—120, at an angle to the track 26.

Looked at in another way, shifting the point *c* in the model to the point *d* on the fixed grading axis is equivalent to moving the point *d* in the model to the point *c'* in space, and the width grader measures the distance from *a* in the moved model to the new actual position of *c* (on the grading axis) and obtains the magnified result *de* which is measured off from the work axis 102. The point *d* in the model (now at *c'* in space) is reproduced at *b*, where $bd=r$ multiplied by $c'd$, and the line 116—114 in the work is the locus of the points *b*. In other words the line 120—114 gives the positions in space of the points of the model axis 108—114 at the instants their corresponding transverse differential elements are being reproduced, and the model axis 108—114 is itself reproduced at 116—114 in the work. The method given for constructing the cam is perfectly general for any problem that may be put. The perpendicular distance from any desired point of the reproduction to the work grading axis, when divided by the grading ratio, will give the distance from the model point being reproduced to the model grading axis at the instant of reproduction. In the foregoing illustrative example the cam 98 is inoperative as a cam from 104 to 114, and the machine operates regularly over this interval.

The differential element the reproduction of which has been above discussed in the line *af*. This would be "reproduced", in the sense of the word characteristic of the old grading mechanism, into a line having the graded length *ef'*, but with the point *b* of the graded line located upon the point *d* of the line 102. The machine of the present invention effects in combination with this reproduction a shift of the line along itself of the amount *db*, but without further grade or change of length. In another way of looking at the matter, at the right-hand end of the figure, where the shifting mechanism is inoperative, the machine may be regarded as measuring the line 106 from the point 112 on the axis, considered as a pole, and reproducing (grading) the line as the line 112—110 measured from the corresponding pole 112 in the work. In the left-hand part of Fig. 4, the line *da* may be considered as measured from the pole *d* in the model and reproduced from the pole *b* in the work. The poles *b* lie on the line 114—116, and each is advanced (vertically in the figure) a little beyond its right-hand neighbor.

The cams 66, 68, which are identical and only one of which is theoretically necessary, may be formed in the same way when the conditions to be satisfied are known. The effect of the cam 66 is to shift relatively to each other differential elements such as 122, 124 extending longitudinally of the model. By means of this part of the machine, the inside ball portion of the sole pattern shown, for example, could be moved ahead or to the rear relatively to the outside ball portion. It should be noticed that the entire longitudinal differential element is moved by the machine and that if such an element as 126 were moved the portion 128 in the heel part would also be moved in the same way, whereas the treatment of all elements lying outside of the element 122 would not affect the heel part. The operation of the two differential element controls is entirely independent, each one producing its result without regard to the operation or lack of operation of the other.

In the illustrated problem just described the length grader is set at zero, and the cams 66, 68 are straight, so that the elements 122, 124 are not shifted at all. They are bent but not shifted or magnified in the sense in which the latter term has been defined herein. The bending appears, for example, in considering the line 102 (considered now as a line of the model) which is reproduced as 116—114—104, bent at 114.

Figure 6:
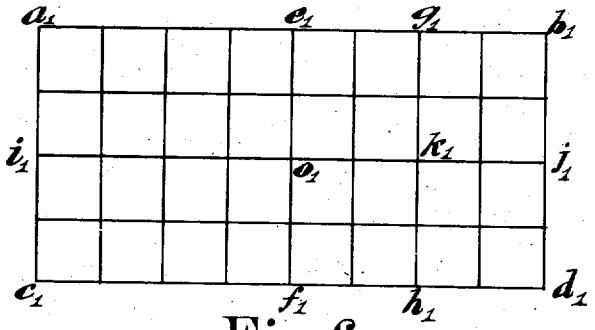
Fig. 6 illustrates a model.
Figure 7:
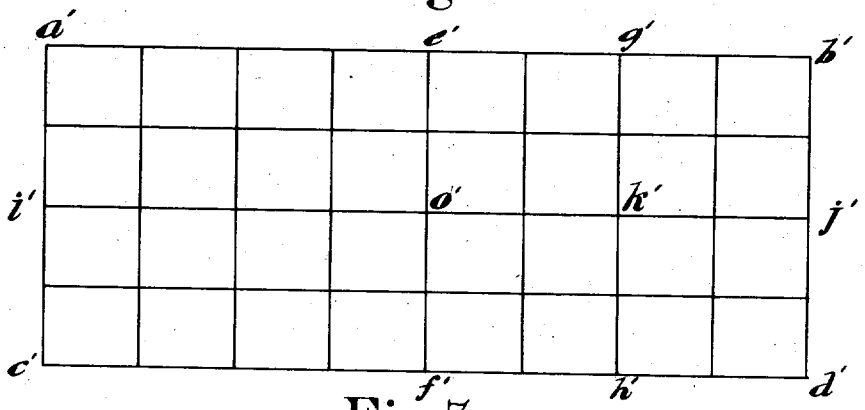
Fig. 7 illustrates the ordinary grading of such a model.

The above example was made to include the action of only one grader and shifting mechanism for the sake of simplicity. The following one is quite general. Fig. 6 shows what we will regard as the model, a rectangle *abcd*. This model may be regarded as composed of either of two sets of differential elements. One set comprises an infinite number of parallel lines $a_1\ c_1$—$e_1\ f_1$—$g_1\ h_1$—$b_1\ d_1$. The other set is similarly formed of the parallel lines $a_1\ b_1$—$i_1\ j_1$—$c_1\ d_1$. The ordinary pattern grader, with its length grader set to a magnification of 1.5 and its width grader set to a factor of 1.25, would produce from this model the rectangle $a'\ b'\ c'\ d'$ shown in Fig. 7, the two sets of differential elements being reproduced and placed as shown in the case of the several individual selected members of the two systems.

Figure 8:
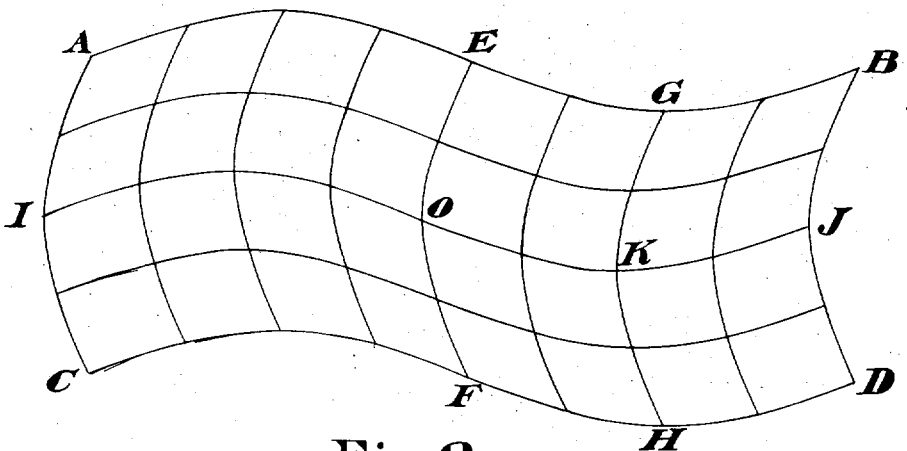
Fig. 8 illustrates the practice of the present invention in regard thereto.

The machine of the present invention with the same grader settings could be used to produce the result shown in Fig. 8, the cam 98 being shaped for example like a complete sine curve, and the cam 68 being shaped like a half of a sine curve. This result may be looked at in two aspects.

1. Such elements as $a_1\ e_1\ g_1\ b_1$ and $i_1\ o_1\ j_1$ are graded as to overall length by the length grader, bent into the forms AEGB and IOJ by the cam 98, and are relatively shifted in accordance with the curve AIC passing through their end points by the cam 68.

2. Such elements as $a_1\ i_1\ c_1$ and $g_1\ k_1\ h_1$ are graded as to overall length by the width grader, bent to the forms AIC and GKH by the cam 68, and are relatively shifted in accordance with the curve AEGB passing through their end points by the cam 98.

The definiteness of the relation between the elements of the model and those of the work is to be particularly emphasized. If the model wheel or tracing point is moved over the element $g_1\ k_1\ h_1$ the tool will trace the line GKH. If the tracing point is placed on the point $k_1$ the tool will be found at the point K. In ordinary use as a pattern grader, only the outlines of the model and work are traversed by the tracing point and tool, but the machine is actually providing a point in the work for every point of the model, in one to one correspondence. As far as this goes, there is no reason why a model need consist of a closed figure. It may be an assemblage of lines or points, such as an embroidery pattern, and such a model also is illustrated by Fig. 6.

The actual production of the work-point may be analyzed as follows: The model-point belongs to the two differential elements of which it is the intersection. It is "reproduced" in the sense characteristic of the old pattern grading machine by having its position changed by movements parallel to both axes. The change here spoken of is that produced by the graders and is different for all points of the differential element in each case. That is, the elements are stretched or shortened by this change. Compounded with this change is another movement parallel to each axis, which is the same for all points of the corresponding element in each case. This movement is produced by the cams.

Consider the four points $o_1\ k_1\ f_1\ h_1$ in Fig. 6. These may be considered as representative of the four elements which pass through them. $o_1$ and $k_1$, $f_1$ and $h_1$, are equally separated horizontally by the length grader; $o_1$ and $f_1$, $k_1$ and $h_1$, are equally separated vertically by the width grader; $o_1$ and $k_1$ are equally shifted horizontally relatively to $f_1$ and $h_1$ by the cam 68, and $o_1$ and $f_1$ are equally shifted vertically relatively to $k_1$ and $h_1$ by the cam 98. All of these movements take place independently. The elements $h_1\ k_1$ and $f_1\ o_1$ are therefore reproduced and relatively shifted, as are also the elements $o_1\ k_1$ and $f_1\ h_1$.

While I have illustrated the invention by means of a mechanism for moving the model in order to effect the relative shifting of reproduced differential elements in two dimensions, this specific construction is not to be regarded as limiting the invention. The fundamental matters in the pattern reproducing machine are the model and work holders and the model wheel and tool, and relative movements between these in pairs, the relative movements being independently proportional (in case of pantographic reproduction) in a plurality of dimensions. Such a machine will pantographically reproduce the model independently in each dimension. In the pattern grading machine as ordinarily built, the model and work remain fixed and all movements are performed by the model wheel and tool. This, however, is not necessary as two, one or none, of the four principal instrumentalities may remain fixed, the relative movements being the only material considerations. My invention introduces a movement of one or more of these instrumentalities, additional to its behavior (either rest or movement) in the normal reproductive function characteristic of the particular machine, which effects a relative shift of differential elements in the model during reproduction, or in another view of the matter, effects a relative shifting in the work of reproduced differential elements of the model, the operation taking place independently in either or both of a plurality of dimensions. In the illustrated machine the special movement is made by the model in both dimensions, but it could be imparted to any one of the other three principal instrumentalities, or the movements incidental to the shifts relating to the different dimensions could be imparted to different instrumentalities. For example, the arm 96 and cam 98 could be arranged to shift the work carrying table, if desired, instead of the block 78.

By the "behavior in the normal reproductive function characteristic of the particular machine" alluded to above, is meant the performance of the machine if provided with straight cams in both length and width dimensions, or without any cams at all, in which cases the slides would remain motionless and the machine be reduced to an ordinary pattern grader. With the movement characteristic of this behavior is compounded the cam produced movement, which effects the relative shifting of the differential elements. The leader, tool, carriages and graders alone really constitute a complete reproducing mechanism capable of performing the work of the ordinary pattern grading machine.

Figure 2:
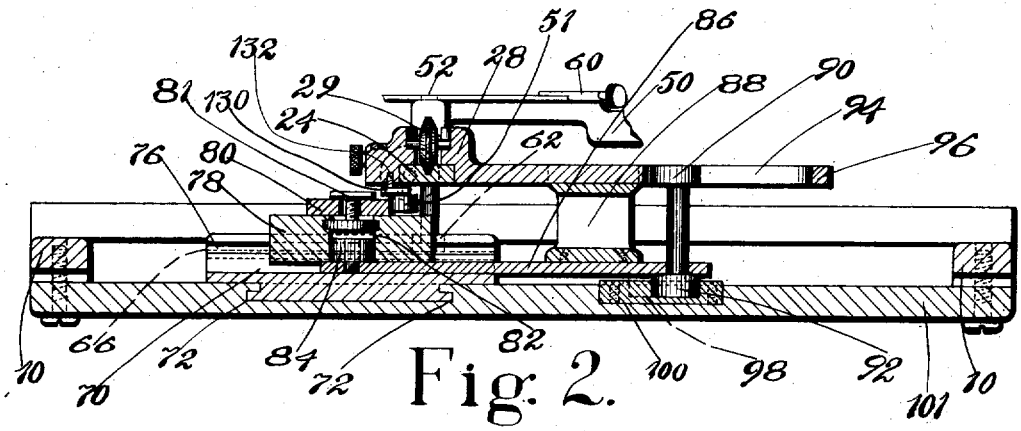
Figure 3:
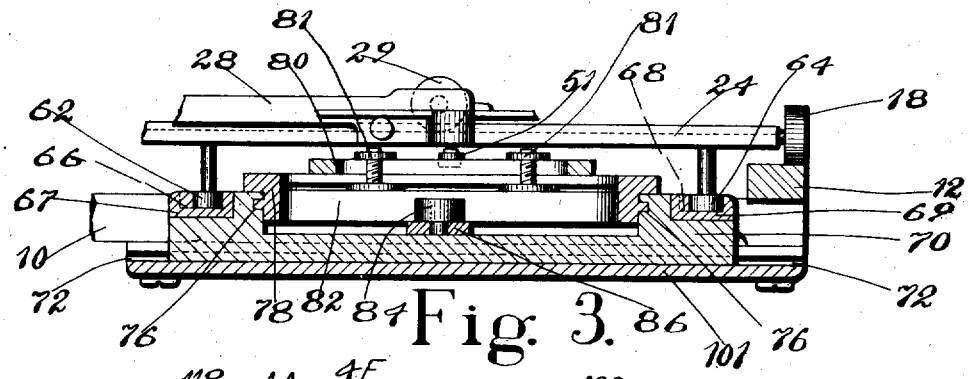
Figure 5:
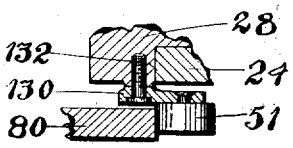
Fig. 5 is a detail showing a non-pantographic reproduction device.

As already suggested, it is not necessary that the machine embodying my invention be a pantographic reproducer. See, for example, Figs. 2 and 5. In Fig. 2 is shown the normal arrangement of the pattern grading machine. The model wheel 51 is suspended from a little arm 130, which swings on a pivot 132. The edge of the wheel 51 is directly under the center of the pivot 132, which is the mathematical tracing point of the machine. In Fig. 5 the edge of the wheel is not under this center. The center 132 will then run around a line at a constant distance within the perimeter of the model, and the pantographic action of the machine, in which I mean to include 1 : 1 reproduction, will refer to this path and not to the actual perimeter of the model, and will not be pantographic at all as referred to the actual model. The differential element shifting produced by the present invention goes on in just the same way as already described, and a shift of reproduced differential elements on one another is produced regardless of the type of reproduction.

To sum up the invention and the action of the illustrated machine, a model (or work piece) may be regarded as divided into a group of differential elements, which in case of a flat model will be thin strips or lines, and in case of a solid model may be also thin plates or laminæ. In such division of a model the differential elements will, in general, be all parallel and can be regarded as related to a "space dimension", i. e., length, breadth or thickness of the model, such a space dimension having the same relation, such as perpendicularity or parallelism, to all of them. Such a division of the model is possible, generally, relative to each space dimension, or relative to each grading axis, of the model; the differential elements of each set being in the same relation to the corresponding space dimension, or grading axis, of the model. For example, in the illustrated embodiment of the invention, the flat model can be regarded as divided into a set of lengthwise lines or widthwise lines, independently, running parallel to the length and width of the model respectively. Here the words "length" and "width" refer to the two space dimensions of a flat object and are not quantitative in meaning. By means of the present invention, the members of these sets of lines may be relatively shifted upon one another in the reproduction in any desired way, or according to a predetermined scheme or law, and this may be done in either set alone or in both sets simultaneously and independently. Such shifting may be effected throughout the whole, or any desired part, of either or both sets, independently.

By the term "shifting" as used herein is meant a small relative displacement of two neighboring parallel strip-like differential elements in a direction parallel to their lengths, or in other words, a lengthwise relative displacement.

The mechanism for moving the model lengthwise (or sidewise) disclosed herein may be called an offsetting mechanism. By this is meant, broadly, a mechanism for causing a movement of one primary instrumentality in the machine, or a relative movement of two of them, in a certain direction, the mechanism being operated by a movement of one of the instrumentalities or a relative movement of two of them in a direction perpendicular to that of the first-mentioned movement. That is, a purely lengthwise movement effected by the operator will cause a purely widthwise movement of the sort described as "shifting." This phenomenon is to be understood as occurring in addition to the ordinary reproductional movement, if any, then occuring in the machine, and the result in the work is a compound of the two. The shifting movement effected by an offsetting mechanism is independent of grading movements. Both types of movement take place independently.

Having described my invention, what I claim as new and desire to secure by Letters Patent of the United States is:

1. In a pattern copying machine, four elements, viz: model and work holders, a model follower and a tool, and grading and shifting mechanism comprising an offsetting device connecting said elements for causing said tool to systematically reproduce and shift parallel to their lengths differential elements of a model in sets lying parallel respectively to a plurality of grading axes in accordance with any predetermined law.

2. In a pattern copying machine, means for holding a model and work, and means comprising a model follower and a tool and a mechanical connection between them causing movements of one to correspond to those of the other for pantographically reproducing in the work sections taken from the model in a plurality of dimensions and cam mechanism controlling the operation of said connection for shifting parallel to their lengths the positions of such reproduced sections upon one another at an arbitrarily predetermined rate as they are formed in any of the dimensions, such shifting taking place during the reproduction of the elements whose positions are thus shifted.

3. In a machine of the class described, means for relatively sliding upon one another differential elements of a model in several dimensions, and means for systematically reproducing such elements in the work in displaced position, said two means comprising model and work holders, a model follower and a tool and cams operating in directions corresponding respectively to said dimensions to modify the operative relation of said holders, follower and tool.

4. That improvement in the art of pattern copying which consists in relatively shifting parallel to their lengths, in accordance with arbitrarily predetermined laws, sections of a model in an arbitrarily selected number of a plurality of dimensions and in systematically reproducing them, while so relatively shifted, in the work.

5. A pattern copying machine comprising four primary instrumentalities, viz., a model holder, a work holder, a model wheel and a tool, mechanism for systematically reproducing in the work sets of differential elements of the model lying parallel to a plurality of grading axes respectively, and means for shifting one of the said primary instrumentalities, independently of its normal behavior incident to the reproduction, in the direction of all of the said grading axes respectively to effect a relative shift, parallel to their lengths, in the positions of reproduced differential elements which are parallel to the two grading axes respectively.

6. In a pattern copying machine, four primary instrumentalities, viz., a model holder, a work holder, a model wheel and a tool, mechanism interconnecting said instrumentalities for pantographically reproducing a plurality of sets of differential elements of a model, the sets being in predetermined relation to a plurality of space dimensions respectively, and cam operated connections between two of the instrumentalities for effecting a relative shift between two of said primary instrumentalities in respect to any selected number of the dimensions to effect relative shifting parallel to their lengths of reproduced differential elements of the model.

7. That improvement in the art of manufacturing irregular objects which consists in grading differential elements of a model with regard to grading axes having directions fixed relatively to the respective directions of grading magnification, and relatively shifting the model and work with regard to the grading axes to effect a relative shift of the graded elements in the work.

8. In a machine of the class described, a model, a model guide arranged to traverse the model in two dimensions, a work piece and a tool arranged to traverse the work piece in two dimensions, and slides, and mechanism for operating them, for relatively shifting parallel to their lengths in both dimensions during the production of the work, those sections of the model and work being operated on, the relative shift in one dimension being a function of the co-ordinate of the model guide parallel to the other dimension.

9. In a machine of the class described, four primary instrumentalities, viz., a model holder, a model wheel, a work holder and tool, the relation between the work holder and tool being controlled by the relation between the model holder and model wheel, supporting and operating mechanism for relatively moving said instrumentalities to effect reproduction of groups of differential elements in the model in a plurality of dimensions, and mobile connections intermediate a plurality of said instrumentalities and the supporting and operating mechanism to effect relative shifting, parallel to their lengths, between differential elements of either group, as desired, in the reproduction.

10. In a machine of the class described, a model holder, a model wheel, a work holder and a work contacting tool, supporting and operating means for these four instrumentalities constructed and arranged for relative movement between the model instrumentalities and the work instrumentalities respectively, the relation between the work instrumentalities being governed primarily by the relation between the model instrumentalities to produce systematic reproduction of differential elements of the model in the work, in respect to a plurality of dimensions, and driving mechanism for compounding with the normal reproductional behavior of a number of said instrumentalities movement to effect a shifting between the positions of reproduced differential elements, parallel to their lengths, corresponding to either or all of the dimensions in the work.

11. In a machine of the class described, model and work holding means, a model follower and tool, grading mechanism connecting them, and a cam mechanism operating on the said connection for pantographically reproducing differential elements of the model in the work in relation to grading axes considered as lying in the model, in such manner that the grading axes themselves are reproduced in the work as lines of different shapes, respectively.

12. In a pattern copying machine for reproducing a plane model in a plane work piece, four elements, viz: a model and a work holding means, a model follower and a tool, and grading mechanism, operating relatively to a grading axis and parallel to the planes of the model and work, operatively connecting the said elements for reproducing each point of the model in the work by means of relative movements of the said elements, and an offsetting device connected to one of the said elements and operated by the said relative movements for offsetting the last-named element perpendicularly to the said grading axis to cause the reproduction of a collinear aggregate of points in the model in a line which is not straight in the work.

13. In a pattern grading machine, a work holder and a model holder, a slide upon which one of said holders is mounted, a cam and mechanism operated by it for moving said slide during the reproduction to effect a shifting parallel to their lengths of reproduced differential elements of the model upon one another.

14. In a pattern grading machine, a work holder and a model holder, a slide mechanism upon which one of said holders is mounted, and mechanism for operating said slide mechanism during the reproduction to effect a shifting, parallel to their lengths, of reproduced differential elements of the model upon one another in either length or breadth at will.

15. In a pattern grading machine, a work holder and a model holder, a slide upon which one of said holders is mounted, and mechanism for moving said slide during the reproduction to effect a shifting parallel to their lengths of reproduced differential elements of the model upon one another in both length and breadth.

16. In a pattern grading machine, four primary instrumentalities, viz., a model holder, and a model follower; a work holder and a tool; arranged to co-operate in pairs as stated to reproduce the model in the work, two slides at right angles mounted one on the other, the upper said slide carrying a said holder, two cam mechanisms each comprising a cam and follower for operating the slides, respectively, and connections between the principal instrumentality cooperating with the said carrier holder and a member of each cam mechanism to operate the cam mechanism.

17. In a pattern grading machine, a model wheel, a slide, a cam and follower between the slide and the model wheel to operate the slide, a second slide mounted on the first said slide, and carrying the model, and a second cam and follower between the model wheel and said second slide to operate the second slide.

18. In a pattern grading machine, a model wheel, a slide, a cam and follower between the slide and the model wheel to operate the slide, a second slide mounted on the first said slide, and carrying the model, and a second cam and follower between the model wheel and said second slide to operate the second slide, said slides being substantially at right angles and responding only to movements of the model wheel perpendicular to their lines of movement, respectively.

19. A pattern grading machine having a model wheel and a tool, a main frame and a first slide in the main frame, a second slide mounted on the first slide at right angles to it, and carrying one of the model or work, and cam mechanism whereby the movement of the model wheel transverse to each slide moves that slide, there being lost motion connection between the upper slide and the model wheel in each direction whereby movement of the model wheel in one direction will not affect the slide which moves parallel to that direction.

20. A pattern grading machine having four primary instrumentalities, comprising model and work holders, model wheel and tool, length and width grading mechanisms connecting the four primary instrumentalities, arranged to guide the relative movement of the work holder and tool from that of the model and model wheel, and two slides connected between two of the primary instrumentalities at right angles for modifying the action of the grading mechanisms on the said primary instrumentalities.

21. A pattern grading machine having four primary instrumentalities, comprising model and work holders, model wheel and tool, length and width grading mechanism connecting the four primary instrumentalities, arranged to guide the relative movement of the work holder and tool from that of the model and model wheel, and two slides at right angles, and means connecting the slides with the grading mechanisms to operate the slides, each slide operating to shift a said primary instrumentality independently of the action of the grading mechanism for modifying the action of the grading mechanism on the said primary instrumentalities.

22. A pattern grading machine having four primary instrumentalities, comprising model and work holders, model wheel and tool, arranged to guide the relative movement of the work holder and tool from that of the model and model wheel, and having length and width grading mechanisms connecting the four primary instrumentalities and two slides at right angles, each slide being connected between a said instrumentality and a grading mechanism, each slide causing a relative movement between a said instrumentality and a grading mechanism for modifying the action of the grading mechanisms on the said primary instrumentalities, and cams extending generally parallel to the length and breadth of the model respectively, for operating the slides.

23. In a pattern copying machine, four primary instrumentalities, viz., model and work holders, model wheel and tool, arranged to control the relative movement of the work holder and tool from that of the model and model wheel, and mechanism for reproducing in positions relatively shifted parallel to their lengths in the work a plurality of sets of differential elements of a model, such sets having fixed relations to a corresponding number of axes respectively, and the said shifted positions being produced in the case of the elements of either set, at will.

24. That improvement in the art of pattern copying which consists in pantographically reproducing in the work differential elements of the model considered in systems relatively to a plurality of space dimensions, and relatively shifting parallel to their lengths the elements in the system related to either dimension at will so that said elements will be reproduced in relatively shifted positions.

25. That improvement in the art of pattern copying which consists in pantographically reproducing in the work differential elements of the model considered in systems relatively to a plurality of space dimensions, and relatively shifting parallel to their lengths the elements of more than one system simultaneously so that said elements will be reproduced in relatively shifted positions.

26. In a pattern grading machine, four primary instrumentalities, viz., a model holder, and a model follower; a work holder and a tool; grading mechanism arranged to cause them to co-operate in pairs as stated to reproduce the model in the work, two slides mounted at right angles to each other in the machine, means connecting each slide with a said primary instrumentality, and mechanism connected with the grading mechanism for operating the slides during the reproduction.

27. In a pattern grading machine, four primary instrumentalities, viz., a model holder, and a model follower; a work holder and a tool; arranged to co-operate in pairs as stated to reproduce the model in the work, two slides mounted at right angles to each other in the machine, means connecting each slide with a said primary instrumentality, and mechanism operated by the relative movement of a said pair of primary instrumentalities for operating the slides, each slide responding only to that component of the said relative movement which is perpendicular to that slide, and being insensitive to the component of the said relative movement which is parallel to that slide.

28. In a machine of the class described for reproducing a plane pattern in a plane work piece, four primary instrumentalities, viz., a model holding means, a work holding means, a model following means and a tool, a grading mechanism operating parallel to the planes of the model and work connecting said instrumentalities and arranged to magnify or reduce a model in a work piece, and an offsetting device constructed and arranged to move a said primary instrumentality in a certain direction in said plane, without modifying the grading factor to cause the reproduction of a collinear aggregate of points in the model non-collinearly in the work, said offsetting device comprising means whereby it may be caused to operate only at predetermined portions of the work, the offsetting device being inoperative at other portions of the work.

29. In a machine of the class described, four primary instrumentalities, viz., a model holding means, a work holding means, a model following means and a tool, a grading mechanism operatively connecting them and arranged to magnify or reduce a model in a work piece, and an offsetting device operating in a fixed plane constructed and arranged without modifying the grading factor, to effect a displacement, parallel to the said fixed plane, of one of the said primary instrumentalities relatively to the others, in the reproduction of predetermined portions only of the model, such displacement being in addition to the relative movement of the four primary instrumentalities characteristic of pantographic reproduction of the model in the work, and such displacement widthwise of the work, at a point being reproduced, being determined by the lengthwise position respectively of such point.

30. In a machine of the class described for reproducing a plane model in a plane work piece, four primary instrumentalities, viz., a model holding means, a work holding means, a model following means and a tool, a grading mechanism operatively connecting them and operating in planes parallel to the planes of the model and work to magnify or reduce a model in a work piece comprising an offsetting device constructed and arranged to modify the operative connection to effect a displacement parallel to a said plane of one of the said primary instrumentalities relatively to the others, without change in the grading factor, such displacement being in addition to the relative movement of the four primary instrumentalities characteristic of pantographic reproduction of the model in the work, and such displacement lengthwise of the work, at a point being reproduced, being determined by the widthwise position of such point respectively, and means for rendering the offsetting device operative at predetermined points of the work only.

31. In a pattern grading machine, four primary instrumentalities, viz., a model holder, a work holder, a model follower and a tool arranged to reproduce a model held in the holder in a work piece held in the work holder, and means for shifting one of the holders in a certain fixed direction, said means being operated by movement of one of said primary instrumentalities in a direction transverse to said fixed direction and comprising a driving mechanism and means whereby the driving mechanism may be caused to shift the shifting holder in the said direction or its opposite as desired, at predetermined portions only of the work.

32. In a pattern grading machine, a model holder, a work holder, a model follower and a tool interconnected and arranged to reproduce a model held in the holder in a work piece held in the work holder, and means for shifting one of the holders in a fixed direction, said means being operated ancillary to relative movement of the tool and work in a direction transverse to said direction and said means being operable during selected portions only of a reproducing operation.

33. In a pattern grading machine, four primary instrumentalities, viz., a model holder, a work holder, a model follower and a tool connected and arranged for relative movement to reproduce a model lying in a plane, in a work piece lying in a plane, and mechanism for effecting a relative movement between two of the said instrumentalities in a certain direction parallel to one of the said planes, in addition to the relative movement characteristic of the normal reproductional action of the machine, said mechanism being operated by a reproductional movement of one of said primary instrumentalities in a direction at right angles to the said certain direction, and means whereby said mechanism may be caused to operate or not at predetermined portions of the work.

In testimony whereof I have signed my name to this specification.

ROSCOE M. PACKARD.